United States Patent

Maytal et al.

[11] Patent Number: 5,910,978
[45] Date of Patent: Jun. 8, 1999

[54] AUDIO/MODEM INTERFACE UNIT

[75] Inventors: Benjamin Maytal, Mevasseret Zion; Aryeh Lezerovitz, Ramat Aviv, both of Israel

[73] Assignee: Smart Link Ltd., Netanya, Israel

[21] Appl. No.: 08/810,264

[22] Filed: Mar. 3, 1997

[30] Foreign Application Priority Data

Mar. 21, 1996 [IL] Israel .......................................... 117609

[51] Int. Cl.$^6$ ................................................. H04M 11/00
[52] U.S. Cl. ..................................... 379/93.01; 379/93.05; 379/93.28
[58] Field of Search ........................... 379/93.01, 93.05, 379/93.08, 93.26, 93.28, 93.31; 381/2

[56] References Cited

U.S. PATENT DOCUMENTS

| | | | |
|---|---|---|---|
| 5,008,903 | 4/1991 | Betts | 375/232 |
| 5,440,740 | 8/1995 | Chen et al. | 650/395 |
| 5,526,408 | 6/1996 | Yekutiely | 379/93.26 |
| 5,581,560 | 12/1996 | Shimada | 379/93.31 |
| 5,752,082 | 5/1998 | Staples | 379/93.05 |
| 5,802,150 | 9/1998 | Beck et al. | 379/93.06 |
| 5,812,870 | 9/1998 | Kikinis et al. | 395/800.323 |

FOREIGN PATENT DOCUMENTS

WO 95 03571  2/1995  WIPO .

OTHER PUBLICATIONS

R.A. Quinnell: "Computer Telephony"—EDN Electrical Design News, vol. 40, No. 16, Aug. 3, 1995, pp. 35–38, 40, 42, 44, XP000526552.

M. Wright: "NSP technology promises free multimedia in PC's"—EDN Electrical Design News, vol. 40, No. 15, Jul. 20, 1995, Newton, Massachusetts US, pp. 49–50, 52,54, 56–60, XP000524746.

*Primary Examiner*—Paul Loomis
*Assistant Examiner*—Melur Ramakrishnaiah
*Attorney, Agent, or Firm*—Ladas & Parry

[57] ABSTRACT

A combined audio and modem interface unit includes a standard audio component and an audio/modem signal processing unit. The audio component has two internal input and two internal output channels and is selectably connectable to at least an audio left port, an audio right port and a telephone port. The signal processing unit separately processes the modem and audio signals received from the audio component. The modem and one stereo audio signal can also be modulated and sent on a single output channel.

17 Claims, 11 Drawing Sheets

AUDIO/MODEM INTERFACE UNIT

FIELD OF THE INVENTION

The present invention relates generally to combined audio and modem interface cards for personal computers.

BACKGROUND OF THE INVENTION

Personal computers are typically non-real-time operation machines. In order to provide them with real-time operation, such as is necessary to provide facsimile, modem, audio or other operation, separate components, often provided as add-on cards, are added to the personal computer. The components include processing units, separate from that of the personal computer itself, which respond in real-time to the incoming and outgoing signals. Thus, there are modem cards, fax cards, fax/modem cards, telephony cards, audio cards, etc. Each card includes its own digital signal processing (DSP) unit which ensures that the response time is as expected. This is of particular importance for fax and modem cards.

FIG. 1, to which reference is now made, illustrates a prior art audio component, such as the AWE32 PnP card by Creative Technology Ltd. of Singapore which implements the SoundBlaster standard. It comprises an audio interface unit 10, a DSP unit 12, a buffer unit 14 and a bus interface 16. The audio interface 10 connects to one or several input devices, such as a PC, CD ROM, a line in for receiving other audio signals, and a microphone. The output of the audio interface 10 is typically to stereo speakers. The audio interface 10 processes the input signals to the point of their conversion to digital signals and prepares the analog output signals from the digital ones.

The DSP unit 12 typically further processes the signals, such as compressing and decompressing them (so that they occupy less space in the computer) and/or generating selected sounds (known as "FM synthesis"). For FM synthesis, the DSP unit 12 receives "audio commands" indicating which FM signals should be synthesized. The FM synthesizing operation can also be performed by a separate unit.

The buffer unit 14 buffers the signals between the computer, which runs at one speed, and the audio interface unit 10, which typically runs at a different speed, i.e. the speed of the input devices. The buffer unit 14 also provides the digital signals to the PC bus interface 16 by which the signals enter the personal computer.

The audio interface unit 10 includes an input section 18 and an output section 20, each of which has left and right channels, thereby to provide stereo audio signals. Per channel, the input section 18 employs an analog to digital (A/D) converter 22 having a variable sampling rate of between 8 and 44 KHz, an anti-aliasing filter 24 and, a mixer to select the source of the input and output signals, if the audio component is connectable to several input and output devices. The anti-aliasing filter 24 typically is an analog low pass filter which filters out all signals and noise above half the sampling rate. The output section 20 also has a mixer 26 and anti-aliasing filter 24 per channel. In addition, the output section has a digital to analog (D/A) converter 28 per channel, for converting the output signals of the DSP unit 12 to analog signals which are later filtered by the anti-aliasing filter 24. The A/D and D/A converters typically have an accuracy of 75–85 dB.

The prior art audio component typically also has several input and output channels (labeled 30) for logic signals and interrupt registers and/or counters 32 which typically are connected between the logic ports 30 and the bus interface 16.

Operating with the audio component, on the personal computer side, is an audio application. If the sound application is a "DOS sound application" 21 operating with the MS-DOS™ operating system, of Microsoft of the USA, then the sound application communicates directly with the audio component. If the sound application is a "WINDOWS sound application" 25, operating with the WINDOWS™ operating system, also of Microsoft, the sound application communicates with the audio component via an audio driver 23.

FIG. 2A, to which reference is now made, illustrates a typical prior art modem card. It comprises a data access arranging (DAA) unit 39, two channels, for input and output, respectively labeled 40 and 42, a modem DSP unit 44, a modem buffer unit 46 and a modem bus interface 48. The DAA 39 provides the physical line interface for the modem signals and handles the telephony operations of dialing, on/off hook detection and ring detection in accordance with instructions from the DSP unit 44. The input and output channels 40 and 42 each have an anti-aliasing filter 50 and respectively have an A/D converter 52 and a D/A converter 54. The converters 52 and 54 typically sample the signals at 8 or 9.6 KHz and the anti-aliasing filters 50 typically have a cutoff frequency of 4 KHz.

The modem DSP unit 44 processes the incoming and outgoing signals in accordance with standard modem practice. This includes converting the signals between symbol format and bit format, modulating and demodulating the symbol format signal onto a carrier frequency, etc. In addition, the modem DSP unit 44 handles the initiation of dialing, on/off hook detection, ring detection and the inter-modem communication ("handshaking") indicating that each symbol is received correctly.

As in the audio component, the modem buffer unit 46 buffers the signals between the computer and the channels 40 and 42. The modem buffer unit 46 also provides the digital signals to the bus interface 46 by which the signals enter the personal computer. A modem application 49 on the personal computer, such as PCPLUS™ or BITCOM™, then further processes the signals.

Native or host signal processing is a technique which utilizes the host CPU, rather than the DSP chip on the card, for processing of the real-time signals of a peripheral card. This requires that the host CPU be able to respond in a real-time manner to the signals being sent by the modem on the other side of the conversation.

PCTEL Inc. of San Jose, Calif., USA has announced a native signal processing modem whose full set of components are illustrated in FIG. 2A, to which reference is now briefly made. FIG. 2A illustrates the modem application 49, the NSP (software) modem 47 on the personal computer side and a digital interface 45, a codec 43 and the DAA 39 on the peripheral side. The codec 43 converts the data between analog and digital formats and the digital interface 45 provides buffering and interface operations between the codec 43 and the personal computer.

Crystal Semiconductor Corporation of Austin, Tex., USA has illustrated, an audio/telephony multifunction multimedia adapter, the CRD4232-2 which combines a number of Crystal and Cirrus Logic chips. The adapter is a single PC peripheral card which processes both audio and telephone signals. The adapter has separate subsystems for the telephone and audio operations; just a controller and a codec (coder/decoder) are shared.

Other companies, such as BestData, Boka and Creative have marketed combined audio/telephony cards and U.S. Pat. No. 5,526,408 to Yekutiely describes a telephony addition to an audio card.

SUMMARY OF THE PRESENT INVENTION

It is an object of the present invention to utilize a standard audio component also for modem interface (either separately or in combination with the audio signals). In addition, the present invention utilizes host (or native) signal processing for processing of the audio and modem signals, rather than having a digital signal processing chip on the PC card.

There is therefore provided, in accordance with a preferred embodiment of the present invention, a combined audio and modem interface unit. The unit includes a standard audio component and an audio/modem signal processing unit. The audio component has two internal input and two internal output channels and is selectably connectable to at least an audio left port, an audio right port and a modem port. The signal processing unit separately processes the modem and audio signals received from the audio component.

Additionally, in accordance with a first preferred embodiment of the present invention, the audio/modem signal processing unit includes a native signal processing modem, an audio stream processor and a datastream controller. The native signal processing modem processes the modem signals and the audio stream processor processes the audio signals in monophonic and stereophonic modes, as directed. The datastream controller directs the modem signals to the native signal processing modem whenever modem signals are present and directs the audio signals to the audio stream processor. The datastream controller also indicates to the audio stream processor to operate in the monophonic mode whenever modem signals are present and in the stereophonic mode otherwise.

Furthermore, in accordance with a preferred embodiment of the present invention, the audio steam processor, when in the monophonic mode, includes a unit for converting between any possible audio format, as desired by an audio application, and a 16 bit monophonic uncompressed format.

Moreover, in accordance with the first preferred embodiment of the present invention, the interface unit also includes an input/output mixing unit which selects the desired ones of the audio left, audio right and modem ports, as per instructions from the datastream controller. The mixing unit also connects the selected ports with the appropriate ones of the internal input and output channels.

Alternatively, in accordance with a second preferred embodiment of the present invention, the audio/modem signal processing unit includes the native signal processing modem and a logical switch which switches operation between a modem mode, during which the logical switch provides the output of the audio component to the native signal processing modem, and an audio mode, during which the logical switch provides the output of the audio component to audio processing units of the CPU.

Moreover, in accordance with a preferred embodiment of the present invention, the unit also includes a telephone interface unit for communicating with the modem channel and a control unit for receiving and responding to telephony control signals, such as at least Ring detection and on/off hook signals.

Additionally, in accordance with a preferred embodiment of the present invention, the control unit has four embodiments. In the first embodiment, the control unit includes the logic input/output ports and the interrupt registers, connected to the i/o ports, of the audio component. The logic input/output ports are connected to the telephone interface unit for receiving the telephony control signals.

In the second embodiment, the control unit includes control input pins forming part of the audio interface unit and connectable to the telephone interface unit for receiving the telephony control signals and to registers for changing state in accordance with the state of the telephony control signals, and a timer interrupt unit for periodically reviewing the status of the registers and generating an interrupt in response to the state of the registers.

In the third embodiment, the control unit includes flip flop units, connectable to the telephone interface unit for receiving the telephony control signals and associated with registers of the audio component, for changing state in accordance with the state of the telephony control signals, and a timer interrupt unit for periodically accessing the registers and the flip flop units and generating an interrupt in response to the state of the registers.

In the fourth embodiment, the control unit includes flip flop units, connectable to the telephone interface unit for receiving the telephony control signals and to interrupt lines of the audio component, for changing state in accordance with the state of the telephony control signals and for generating an interrupt when the telephony control signals are activated.

Further, in accordance with a preferred embodiment of the present invention, the unit includes a modem pre-filter for converting telephony signals from audio level filtering to modem level filtering including converting the sampling rate, increasing the signal/noise ratio of the signals and sharpening the signal.

Moreover, in accordance with a further preferred embodiment of the present invention, the datastream controller includes, on output, a unit which modulates a first audio channel and combines the first audio channel with the modem signals. The interface unit also includes an output unit which separates the combined audio and modem signals, provides the modem signals to the modem port, the first audio channel to a first one of the audio ports and a second audio channel directly to a second one of the audio ports.

There is also provided, in accordance with the present invention, a method for generally simultaneously communicating audio and modem signals with a personal computer. The method includes the steps of:

providing an audio component having first and second input/output channels;

providing a monophonic audio signal along the first input/output channel and a modem signal along the second input/output channel, the audio component producing, on output, a datastream alternating between data of the first and second channels; and streaming the datastream to the appropriate one of audio and modem processing units.

Finally, in accordance with a preferred embodiment of the present invention, the step of streaming includes the steps of:

transferring the datastream to a memory element of the personal computer wherein data from the first channel is written to a first set of addresses within the memory element and data from the second channel is written to a second set of addresses within the memory element; and indicating to the audio processing unit to read from the first set of addresses and to the modem processing unit to read from the second set of addresses.

Finally, the method can include combining the modem signals and the first audio component signal by modulating the first audio component signal above the highest expected frequency of the modem signals. The combined signal is provided along a first output channel to an audio card. On the audio card, the combined signal is separated, providing modem signals to the modem port and the first audio component signal to a first speaker. The second audio component signal is provided directly to the second speaker.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention utilizes an audio component for modem processing also, either in conjunction with audio processing or instead of it. The present invention can utilize a commercially available audio component, such as one which is compatible with any of the SoundBlaster, Windows Sound System or Direct Sound standards.

The present invention will be described for processing modem signals. It will be appreciated that the modem processing units of the present invention can easily be replaced by telephony processing units, thereby providing telephony via an audio component.

Figure 3:
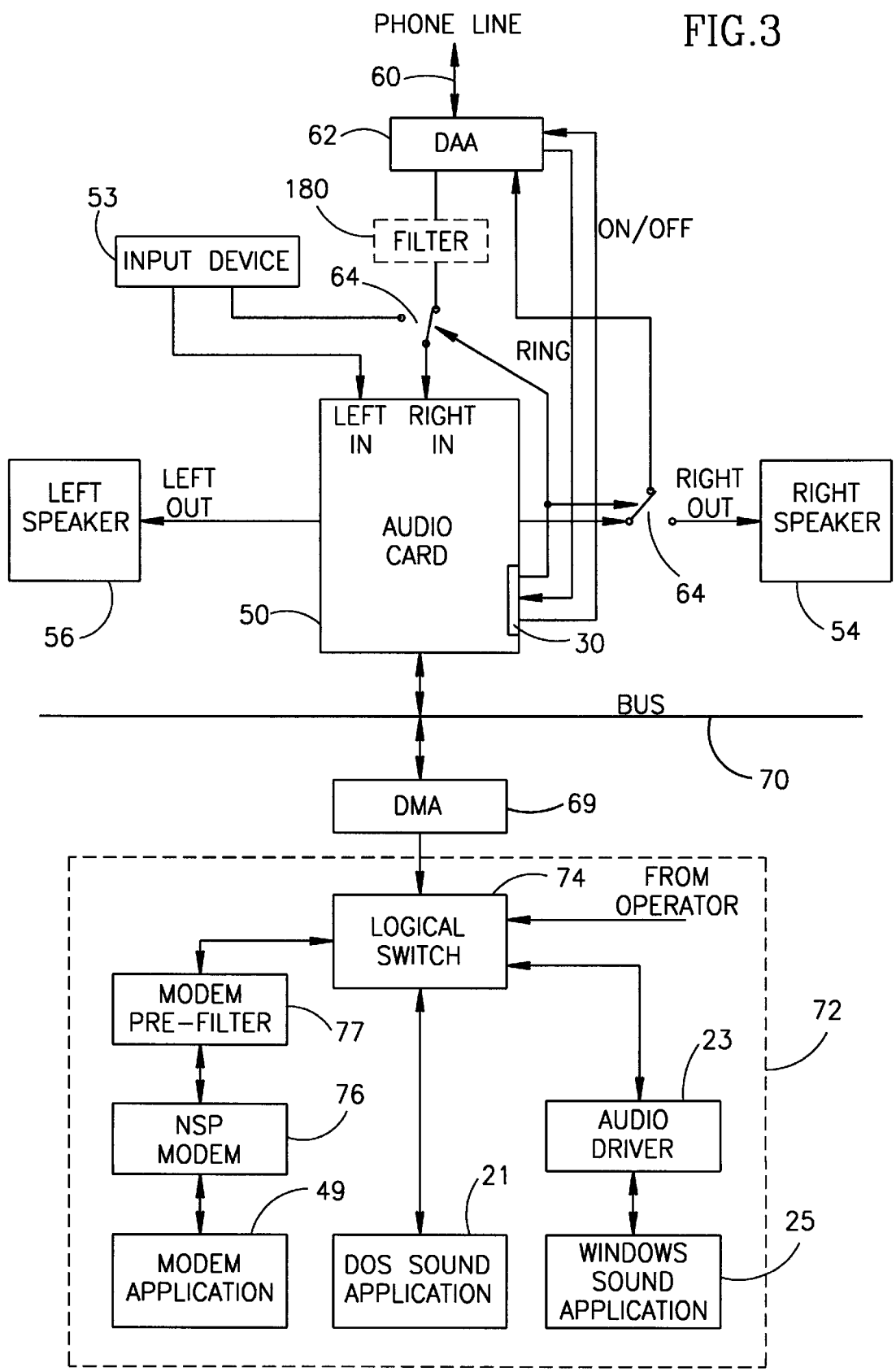
FIG. 3 is a block diagram of a combined audio and modem card, constructed and operative in accordance with a first preferred embodiment of the present invention.

FIG. 3, to which reference is now made, illustrates how an audio component is utilized for modem operations. In this embodiment, when a modem signal must be processed, no audio signals can be processed.

The audio component 50 is connected, for audio input, to a two channel input devices 53, such as a microphone and/or other audio input devices. For audio output, component 50 is connected to right and left speakers 54 and 56, respectively. In accordance with a preferred embodiment of the present invention, one of the channels (the right channel is shown as an example) is selectively connectable to a phone line 60 via DAA 62. Thus, the right input line of the input device 53 and the right output line of speaker 54 include a controllable switch 64 which switches the signals to the right channel between audio and modem signals. FIG. 3 illustrates switch 64 in the "modem mode".

The audio component 50 connects to a bus 70 of the personal computer and bus 70 is connected to the central processing unit (CPU) 72 of the personal computer. The bus interface is also connected to a direct memory access (DMA) unit 69. The CPU 72 typically operates many different applications. For the present discussion, the CPU 72 can operate modem application, and one or both of a DOS sound application 21 or WINDOWS™ sound application 25. The WINOWS™ sound application 25 operates in conjunction with the audio driver 23. In the telephony embodiment, the modem application 49 is replaced by a telephony application.

In accordance with a preferred embodiment of the present invention, the CPU 72 also operates a logical switch 74, a native signal processing (NSP) modem unit 76, and a modem pre-filter 77. The logical switch 74 switches between modem operations and audio operations in response to a Ring interrupt, received through the I/O ports 30, or in response to a signal from the modem application 49 (FIG. 2). For modem operations, logical switch 74 directs data to and from the NSP modem unit 76, via the modem pre-filter 77, while, for audio operations, logical switch 74 directs data to and from either the DOS™ sound application 21 or the audio driver 23. For the telephony embodiment, the NSP modem unit is replaced by a NSP telephony unit which performs the necessary telephony operations.

Figure 1:
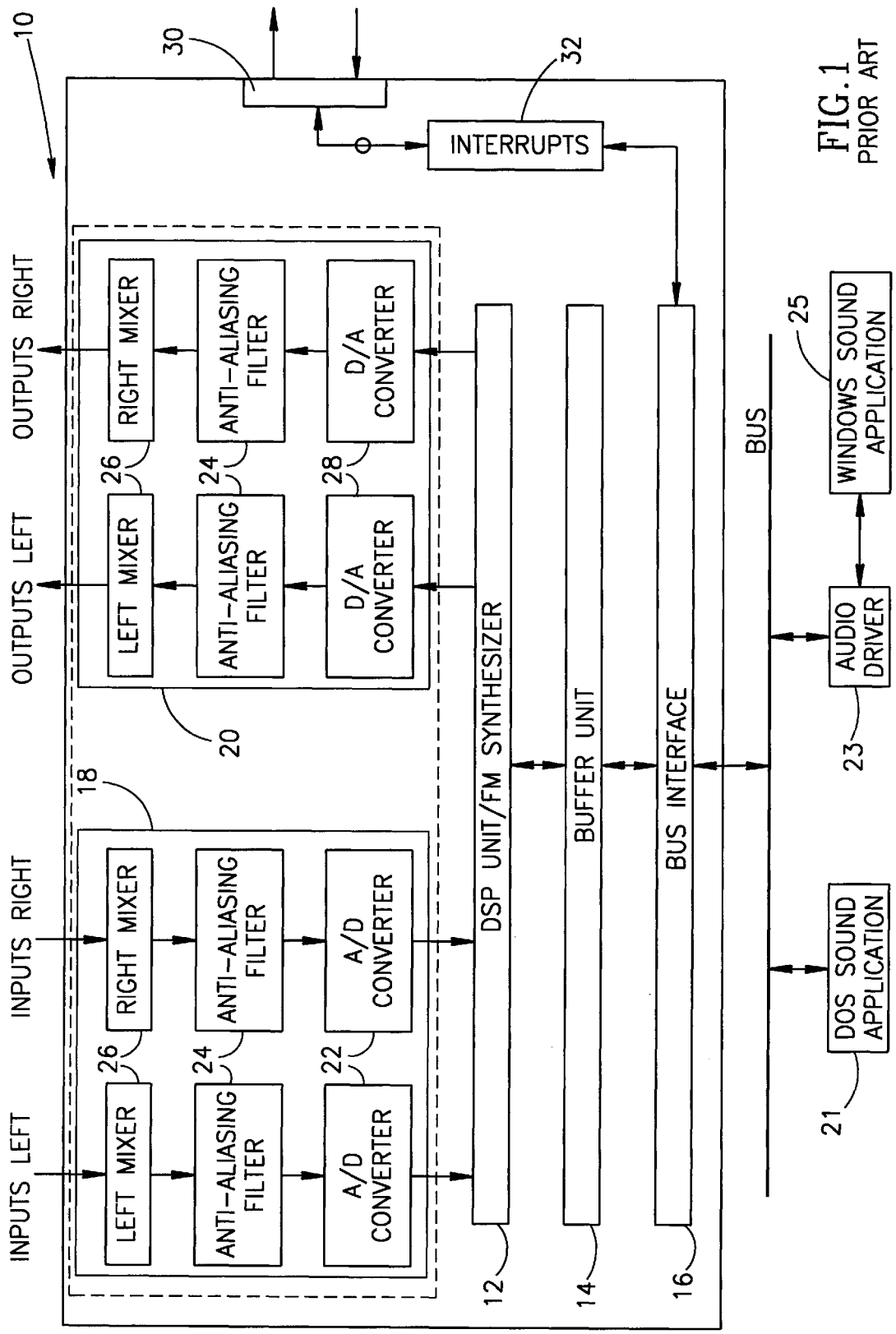
FIG. 1 is a block diagram of a prior art audio component and sound applications.
Figure 2A:
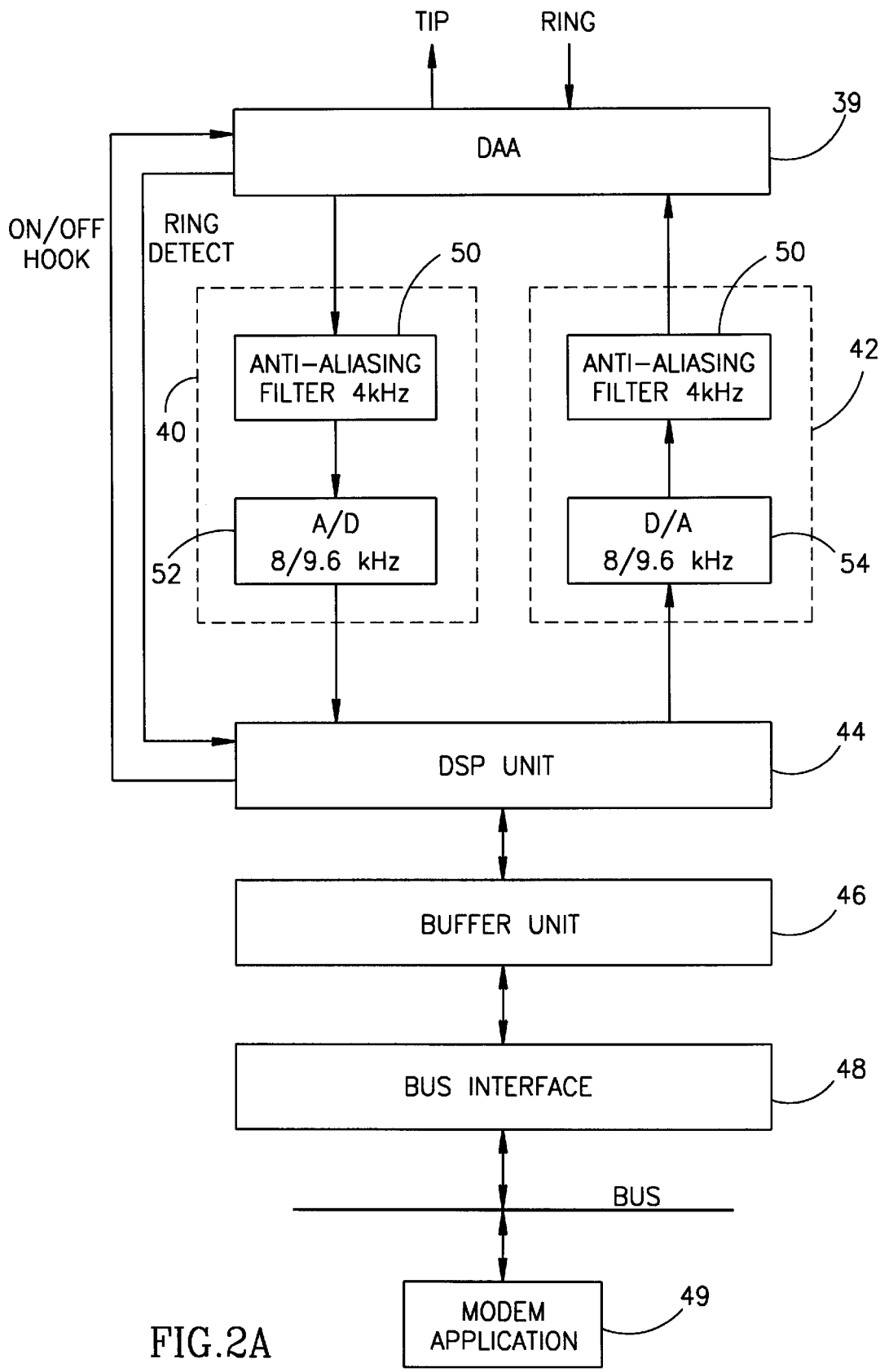
FIG. 2A is a block diagram of a prior art modem card and modem application.
Figure 2B:
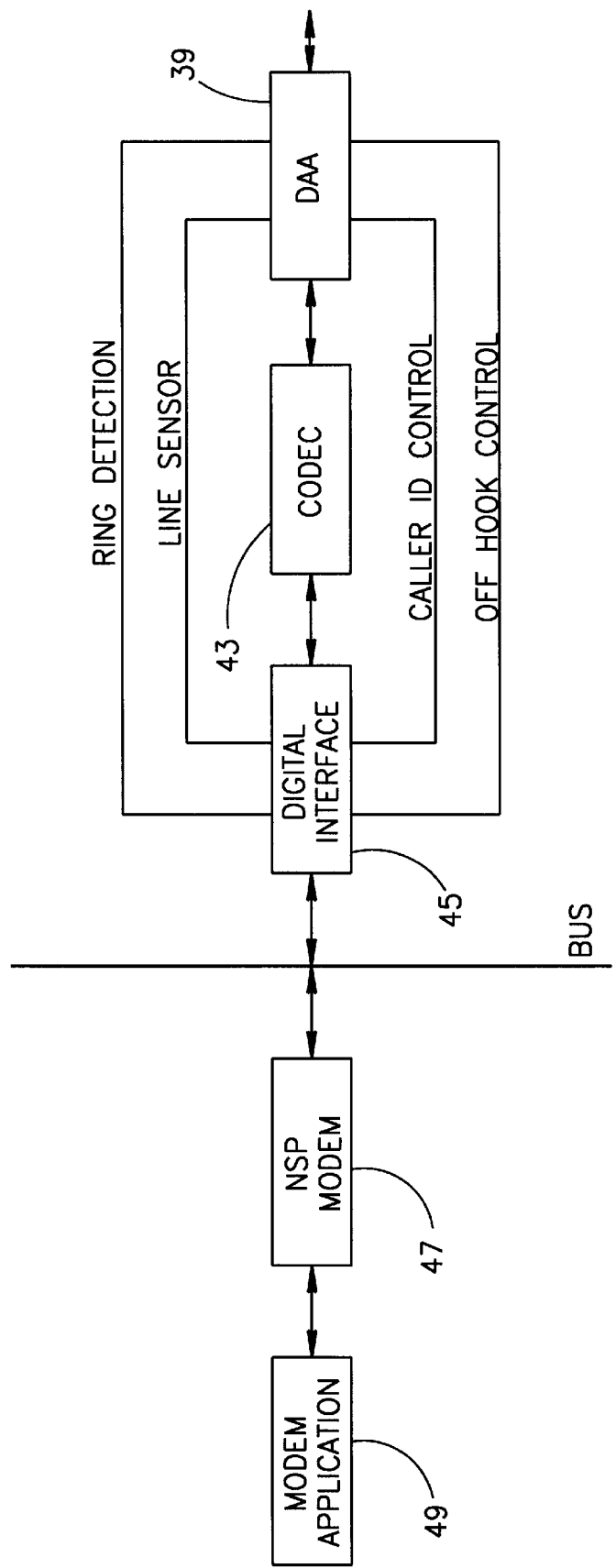
FIG. 2B is a block diagram of the elements of a prior art native signal processing modem and modem application.

The NSP modem unit 76 performs all the processing necessary on the modem signal which, in the prior art, were performed by the DSP unit 44 (FIG. 2A). The book, *The Theory and Practice of Modem Design*, by John Bingham, describes the operations which NSP modem unit 76 performs and is incorporated herein by reference. For example, the NSP modem unit 76 performs operations such as demodulating/modulating, filtering, compressing/decompressing and any handshaking operations. Therefore, the modem application 49 communicates with the NSP modem unit 76 in the same manner as it communicates with the prior art modem of FIG. 2A.

It is noted that, when the NSP modem 76 initiates a communication session, it provides a switching signal to logical switch 74 to switch to the modem mode. Typically, the logical switch 74 does so by first providing a closing indication to the audio application that the audio application is about to be shut down and then switching to pass only modem data to and from the DMA 69. Furthermore, the logical switch 74 provides control signals, via the logical I/O ports 30, to switches 64 to receive modem signals only. At the end of the modem session, logical switch 74 indicates to switches 64 to resume receiving audio signals.

It is noted that modem signals are generally filtered to 4 KHz while audio signals are generally filtered to 22 KHz. Thus, the audio component 50 filters the modem signals passed therethrough to 22 KHz. In addition, the accuracy of the filters are below that required by modems.

To compensate for this, modem pre-filter 77 comprises a seventh-order low pass filter, which has a cutoff frequency of 4 KHz, and a sigma-delta filter which, on input, resamples the 22 KHz or 44 KHz sampled signal, reduces it to an 8 KHz sampled signal and increases the accuracy by 10–15 dB. On output, the modem pre-filter 77 performs the opposite operations. It is noted that the seventh-order low pass filter has a sharper bandwidth than the anti-aliasing filters 24 of the audio component 50.

Alternatively, the present invention can include an appropriate hardware filter unit 180 between the audio component 50 and the DAA 62 which acts similarly to the modem pre-filter 77.

The DAA 62 transfers the telephony signals, communicated through the audio component 50. For example, the DAA 62 detects the ring signals, providing indications of their presence to the logic I/O ports 30 of the audio component 50 which, in turn, produces interrupt signals to the NSP modem 76 therefrom. Furthermore, the DAA 62 produces on/off hook signals as indicated by signals from the NSP modem 76 and received through the logic I/O ports 30.

Some audio components 50 do not have I/O ports 30. This is of particular concern for the Ring signal which must generate an interrupt to activate the modem application, as described hereinabove, but is also of concern for providing the on/off hook and the switch control signals. Some audio components 50 have control pins which are registered to an internal register but do not create an interrupt. Others have no spare pins.

For the audio components with control pins, the present invention connects the Ring signal to the control input pin and the on/off hook and switch control signals to the control output pins. As a result, when the Ring signal is active, it will change the value of a bit stored in the register associated with the control input pin. The logical switch 74 then periodically (e.g. every 20 ms) generates a timer interrupt at which time the associated register will be read. If the bit of the register is set, the logical switch 74 calls to a ring detect function of the NSP modem 76.

For the output signals, when the logical switch 74 wishes to activate the on/off hook signal or to signal to the switches 64, logical switch 74 writes to the registers associated with the control output pins, thereby causing a signal to be generated on the control output pins.

Figure 4A:
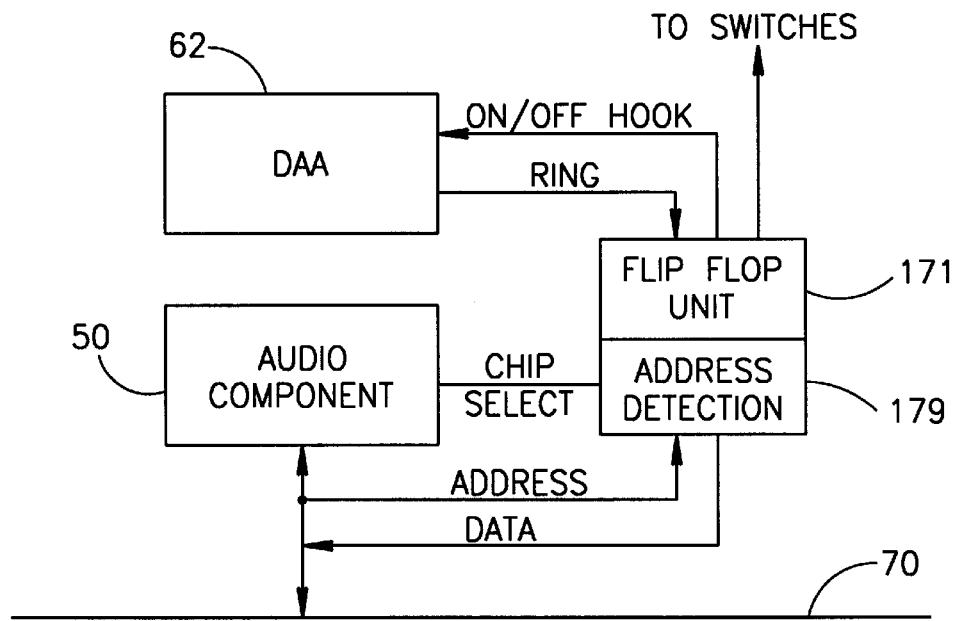
FIGS. 4A and 4B are block diagram illustrations useful in understanding the units of FIGS. 3 and 5.
Figure 4B:
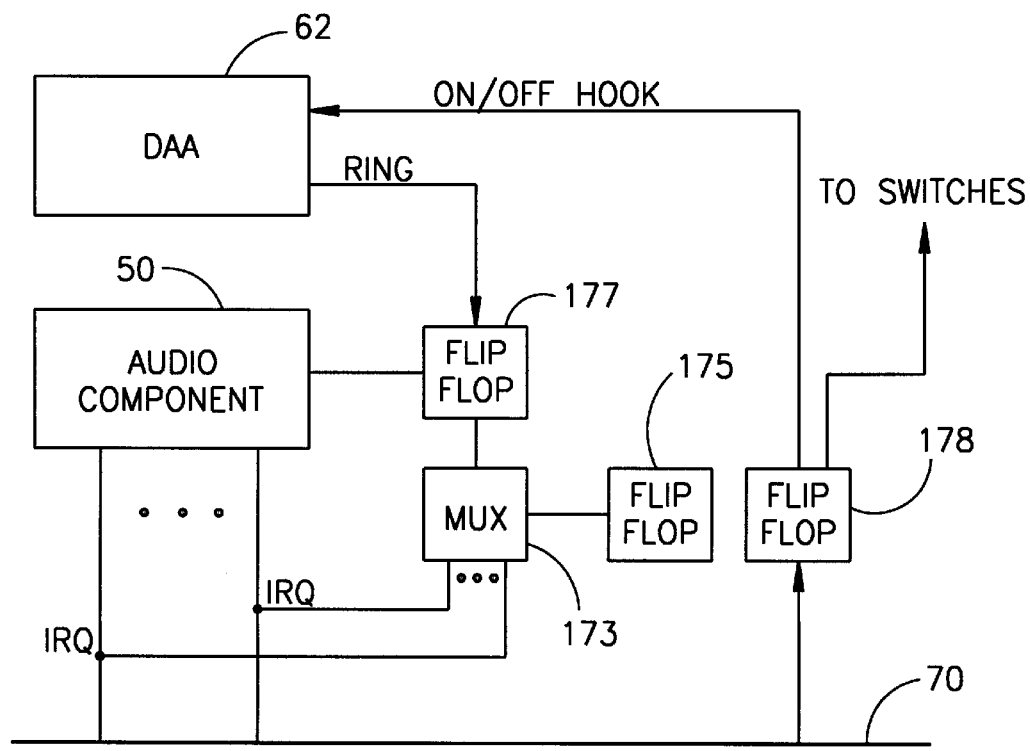

For the audio components with no spare pins, there are two possible solutions, illustrated in FIGS. 4A and 4B, respectively, to which reference is now briefly made. In the first solution, the Ring, on/off hook and switch control signals are connected to hardware flip-flop units 71 connected between the DAA 62 and the bus 70. The flip flops change state when activated by the ring, on/off hook or switch control signals. The addresses for the flip flops of units 71 are unused addresses, or bits of addresses, within the address range of the audio component 50.

The flip flop units 71 additionally comprise an address detection unit 79 which receives address signals from the bus 70 and a chip select or driver enable signal from the audio component 50. The chip select and driver enable signals indicate when an address in the audio component 50 has been accessed. Thus, when such signals are activated, the address detection unit 79 reads the address provided from the bus 70 and, if the accessed address is the one corresponding to one of the flip flops, the flip flop unit 71 provides its state to the bus 70. Typically, the flip flop unit 71 is accessed periodically to determine the state of the ring signal.

For output signals, (e.g. the on/off hook and switch control signals), the bus 70 writes to the associated address of the audio component 50, which access operation the address detection unit 79 detects. In response, the address detection unit 79 causes the relevant flip flop to change state. The DAA 62 or switches 64 will respond accordingly.

It will be appreciated that, if the addresses of the flip flops are a few bits within an address, for example, bit 7 of address 169, then the address detection unit 79 only has to decode for the bits of interest. Taxis reduces the size of the address detection circuitry.

In the second solution (FIG. 4B), a flip flop 177 is connected to the interrupt request (IRQ) lines of the audio component 50 and acts to pull down the relevant IRQ line whenever the ring signal is activated. Since the "Plug and Play" standard requires that the IRQ line not be specified until the component is "plugged" into a particular personal component, the flip flop 177 cannot be directly connected to the IRQ lines. Instead, at the time of plugging in, the personal computer stores the number of the selected IRQ line in separate flip flops 175. The separate flip flops 175 are connected to a multiplexer (MUX) 173 which is also connected to the flip flop unit 177. When the flip flop 177 changes state, as a result of activation of the ring signal, the MUX 173 pulls down that IRQ line whose value is stored in the flip flops 175.

Flip flop unit 178, to which the on/off hook and switch control signals are connected, operate as described hereinabove for flop unit 171.

The embodiment of FIG. 3 does not allow modem and audio signals to flow at the same time. The embodiment of FIG. 5, to which reference is now made, utilizes the dual channel ability of the audio component 50 to allow both types of signals to flow at the same time. One channel is designated for modem signals and the other channel is designated for audio signals. Thus, when both modem and audio signals are present, the audio signals must be monophonic signals.

Figure 5:
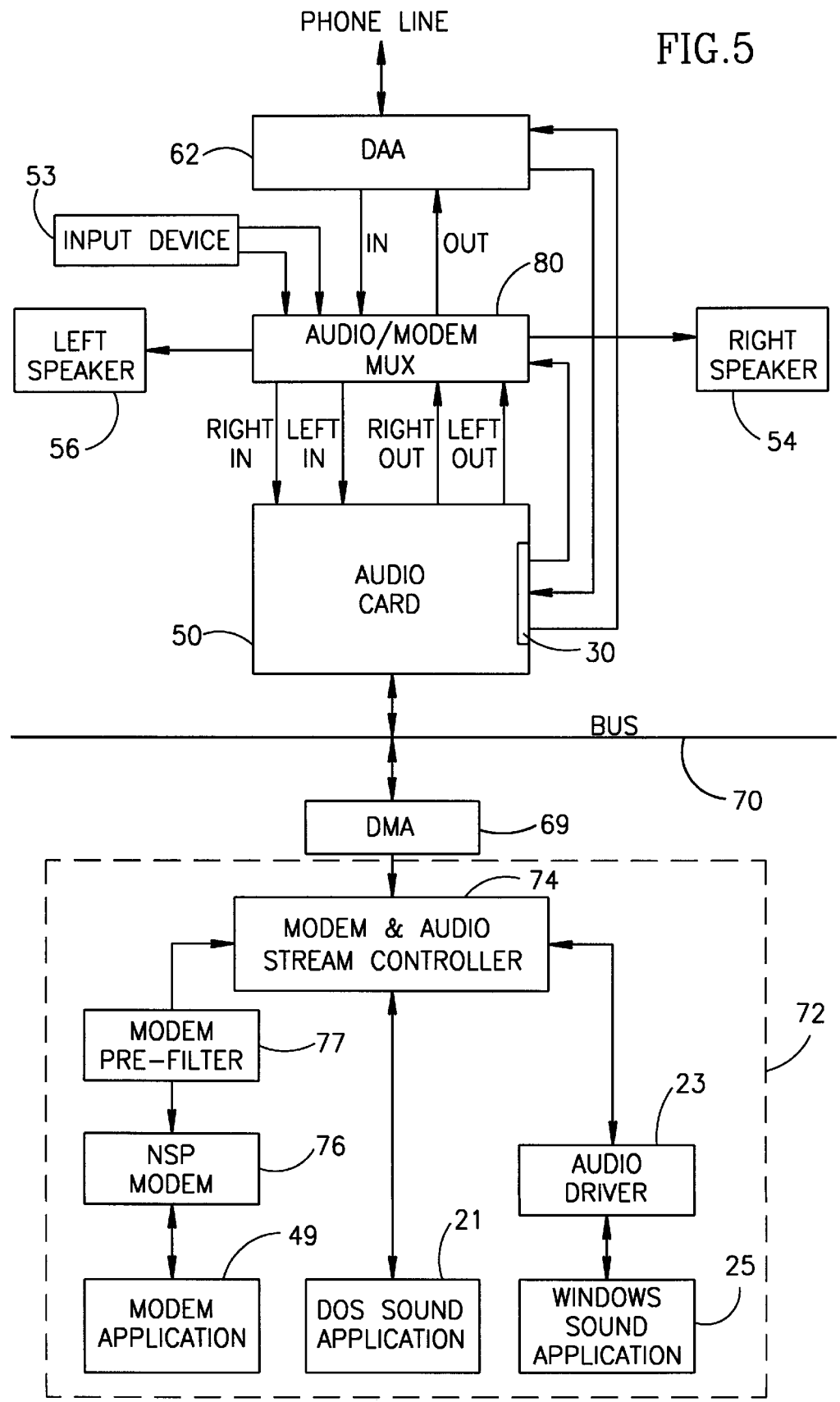
FIG. 5 is a block diagram of a combined audio and modem card, constructed and operative in accordance with a second preferred embodiment of the present invention.

FIG. 5 illustrates the system of the present invention having audio and modem signals active at the same time and utilizes elements from the previous embodiment.

Figure 6:
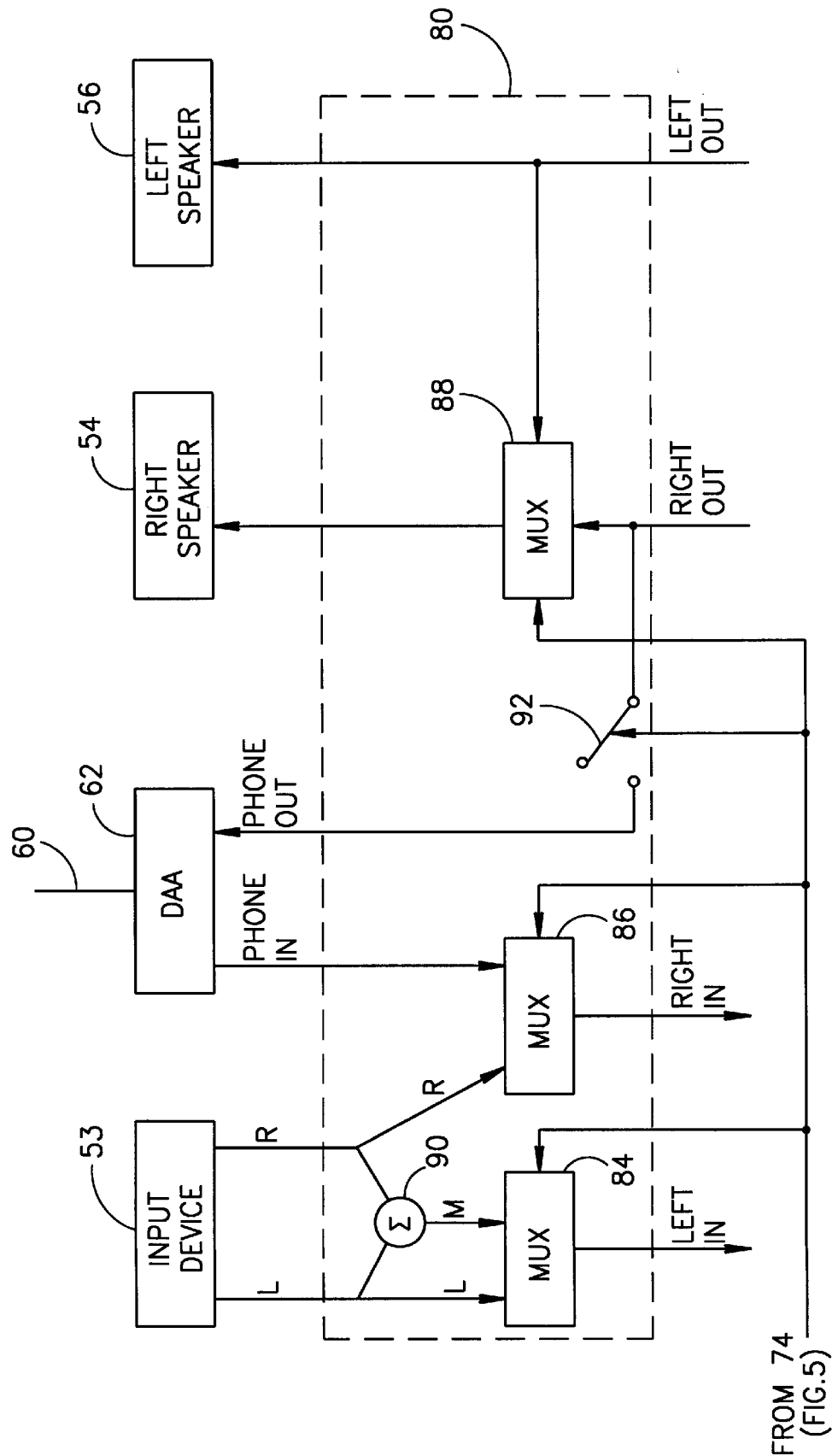
FIG. 6 is a block diagram illustration of an input/output multiplexing unit forming part of the card of FIG. 5.
Figure 7:
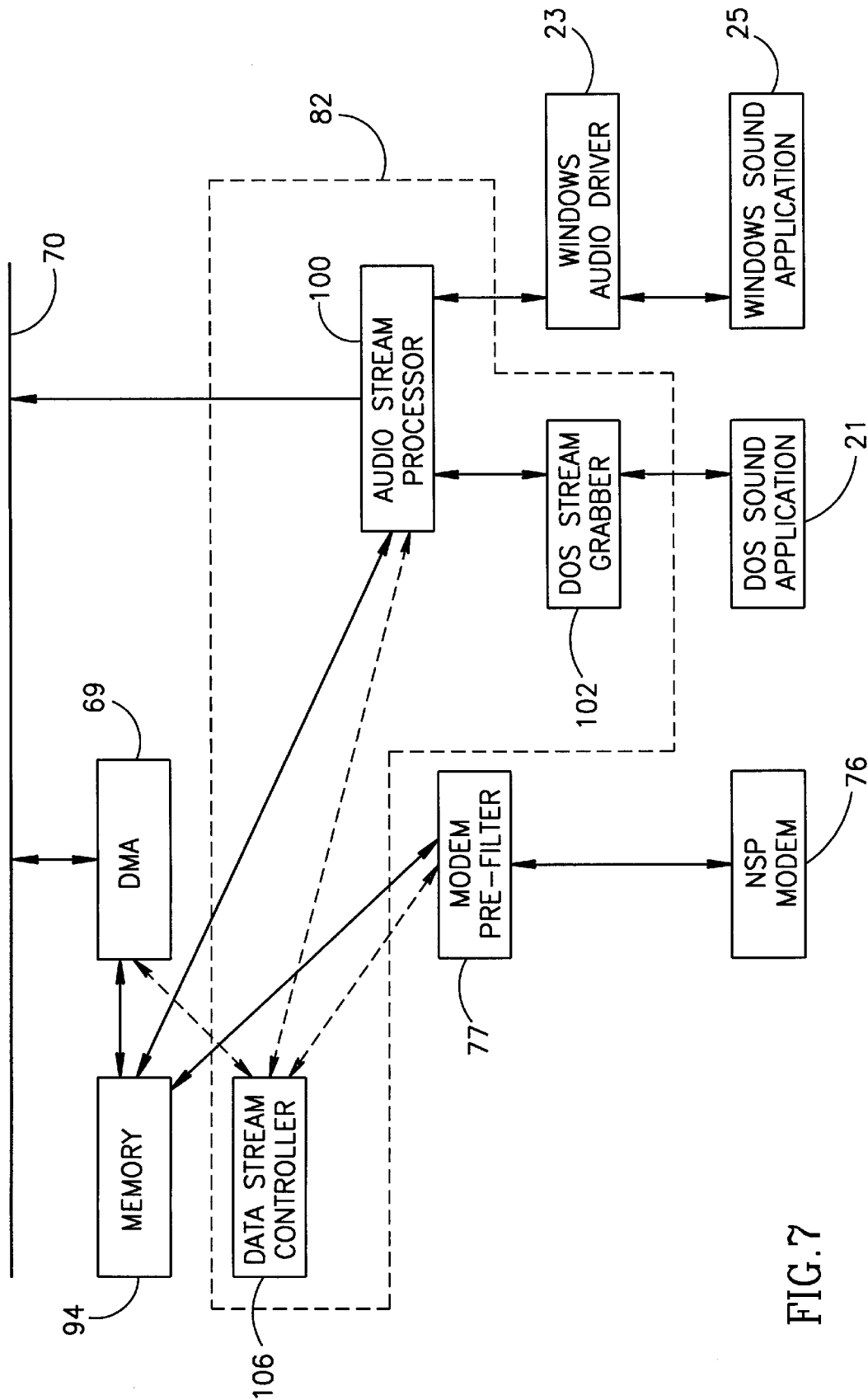
FIG. 7 is a block diagram illustration of an audio/modem stream controller forming part of the card of FIG. 5.

Therefore, similar elements have similar reference numerals. FIGS. 6 and 7, to which reference is also made, detail some of the elements of the system of FIG. 5.

The unit of FIG. 5 comprises, as in the previous embodiment, the audio component 50, speakers 54 and 56, the DAA 62, the input device 53, the bus 70, the NSP modem 76, the modem pre-filter 77, the modem application 49, the DOS sound application 21, the WINDOWS sound application 25 and the audio driver 23, all of which operate as in the previous embodiment. In addition, the unit of FIG. 5 comprises an audio/modem multiplexer (MUX) 80 and a modem/audio stream controller 82.

The MUX 80 is connected between the audio component 50 and the input and output units (the DAA 62, the input device 53 and the speakers 54 and 56). The MUX 80, under control of the modem/audio stream controller 82 via the logic I/O ports 30 (or the units of FIGS. 4A or 4B), multiplexes between stereo audio signals and the combination of modem signals and monophonic audio signals and provides such signals to and from the audio component 50. Like the logical switch 74, the stream controller 82 directs the data signals from the audio component 50 to the applications which will process them. However, the stream controller 82 receives both types of data signals at the same time and thus, does not switch from one to the other but directs the signals to their final destinations, as will be described in more detail hereinbelow.

The MUX 80 multiplexes three ports down to two input/output channels and is detailed in FIG. 6 along with the input/output elements to which it is connected. In the example of FIG. 6, MUX 80 provides the right input/output channel for modem operations; it will be appreciated that the left input/output channel can also be utilized, mutatis mutandis, and that the channels can be alternated. It is further noted that, for clarity of drawing only, the left speaker 56 is located, in FIG. 6, on the right side.

MUX 80 comprises three small multiplexers 84, 86 and 88, a summer 90 and a switch 92, all controlled by the switch control signal from the modem and audio stream controller 74. Summer 90 combines the left (L) and right (R) output signals of the input device 53 into a monophonic (M) audio signal. MUX 84 provides the left input signal to the audio component 50 and selects between the left (L) microphone signal and the monophonic (M) audio signal. MUX 86 provides the right input signal to the audio component 50 and selects between the right (R) microphone signal and the input phone signal.

On output, the audio signal is a monophonic signal when the modem is active. Otherwise, it can be either a monophonic or a stereo signal. When both audio and modem signals are created, the system provides the monophonic audio signal along the left output channel, directly to the left speaker 56 and MUX 88 provides a copy of the left output channel to the right speaker 54. In that situation, switch 92 is closed, thereby providing the right output signal (which carries the modem signal) to the DAA 62. When only a stereo audio signal is present, switch 92 is open, MUX 88 provides the right output channel (carrying the right audio signal) to the right speaker 54 and the left audio channel, carrying the left audio signal, is provided directly to the left speaker 56.

It is noted that, in this embodiment, the audio component 50 outputs the signals of the left and right channels as a single datastream with the data from the two channels interleaved. Thus, the datastream alternates between data from the left channel and data from the right channel. When the two types of data are present, the datastream from the audio component 50 alternates between modem and audio data. Regardless of the type of data, the DMA transfers the data from the bus 70 to a memory unit 94. Since the data from the two channels is interleaved, data from one channel will be stored in the odd addresses in memory unit 94 and data from the other channel will be stored in the even addresses.

As detailed in FIG. 7, the stream controller 82 comprises an audio stream processor 100, a DOS stream grabber 102 and a datastream controller 106. The datastream controller 106 instructs the other units as to how to operate.

When only audio signals are present, the datastream controller 106 indicates to the audio stream processor 100 to read, for input, from the even and odd addresses of memory 94 and to provide the data to the sound applications 21 and 25 as left and right audio channels. On output, the datastream controller 106 indicates to the audio stream processor 100 to either write audio data into all addresses of memory 94 or to write audio commands directly to the FM synthesizer of the audio component 50. The DMA 69 then transfers the audio data to the audio component 50 for output.

The audio stream processor 100 receives audio data and commands from either the audio driver 23 (for WINDOWS application 25) or from the DOS stream grabber 102 which grabs the output of the DOS sound application 21 before the output is provided to the bus 70 (either directly or via the DMA 69). DOS stream grabber 102 operates by having traps on specific addresses. Whenever one of the addresses is accessed and before the data is stored in the address, DOS stream grabber 102 receives the data and then provides the data to the audio stream processor 100.

When the datastream controller 106 receives an indication, from either the interrupt registers of the audio component 50 or from the NSP modem 76, that modem signals are also to be present, the datastream controller 106 commands the MUX 80 to switch to operating with both modem and monophonic audio signals. The datastream controller 106 indicates to the audio stream processor 100 to read from only the odd addresses of memory 94 (which hold the audio data) and to provide the data to the sound applications 21 and 25 as monophonic audio data. The datastream controller 106 also indicates to the modem pre-filter 77 to read from only the even addresses of memory 94 (which hold the modem data). Similarly, for output, the modem pre-filter 77 writes to the odd addresses and the audio stream processor 100 writes to the even addresses.

In this combined mode, the datastream controller 106 also indicates to the audio stream processor 100 to create 16 bit monophonic signals, at 22 KHz or 44 KHz in any possible audio format, from the stereo audio data it receives as output from the sound applications 21 or 25, via the DOS stream grabber 102 or the audio driver 23, respectively. Since the audio component 50 processes both of its channels the same way, the audio channel has to be adapted to match the processing desired for the modem channel. Thus, since the modem channel is 16 bit, the audio stream processor 100 has to convert the stereo audio data to 16 bit monophonic audio data, if it is not that way already. Similarly, since the data in the modem channel is not compressed, the data of the audio channel must not be compressed. Thus, if the sound applications 21 or 25 require compressed data, the audio stream processor 100 has to decompress the data from the sound applications 21 or 25 and to compress the data being provided to them. Finally, the audio stream processor 100 has to convert the audio commands to the FM synthesizer to monophonic commands.

On input, the datastream controller 106 performs the opposite operations to provide the sound applications with data in the format they expect. Thus, if required, the received monophonic signal has to be provided as a stereo signal (i.e. by providing two copies of the monophonic signal), the number of bits per sample has to be converted to 8 bits, the data has to be compressed and the format changed to the one expected by the sound applications.

As mentioned hereinabove, the present invention can also be utilized for telephony applications. For such a system, the modem pre-filter is replaced by a telephony pre-filter which filters the telephony data to the appropriate bandwidth. The NSP modem is replaced by a NSP telephony unit which performs the desired telephony operations (dialing, passing the telephonic signal to the speakers, decompressing the telephonic signal, etc.).

Figure 8:
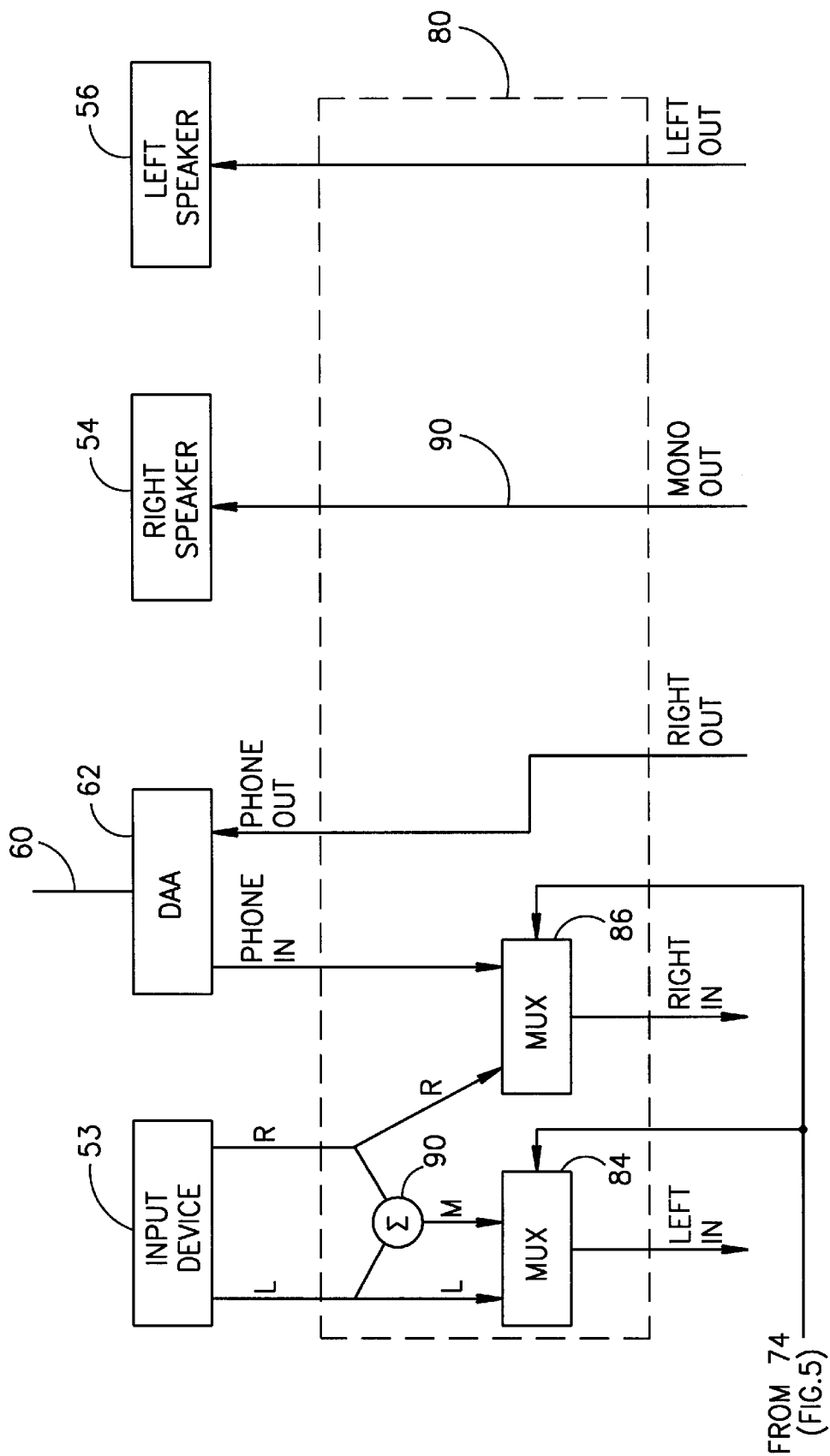
FIG. 8 is a block diagram illustration of a further embodiment of the input/output multiplexing unit of FIG. 6 operative with a mono-out channel.

Reference is now briefly made to FIG. 8 which provides an alternative embodiment of MUX 80. This embodiment is relevant to audio chips that can transfer right and left audio streams through a mono-out channel 90 and can mute (upon selection) any one of these two audio streams. In this version, MUX 80 comprises two small multiplexers 84, 86 and a summer 90, all controlled by a switch control signal from the modem and audio stream controller 74. Summer 90 combines the left (L) and right (R) output signals of the input device 53 into a monophonic (M) audio signal. MUX 84 provides the right input signal to the audio component 50 and selects between the right (R) signal and the input signal (phone in).

On output, the left-out is connected only to left speaker 56, right-out is connected to DAA 62 (phone-out), and mono-out is connected to right-speaker 54.

The audio signal is a monophonic signal when the modem is active. Otherwise, it can be either a monophonic or stereo signal. When both audio and modem signals are created, stream controller 74 provides the monophonic audio signal along the left output channel, directly to the left speaker 56 and a copy of the left output (via mono-out channel 90) channel to the right speaker 54. In that situation, right output channel (which is connected to DAA 62) carries the modem signal. It is noted that while DAA 62 is on-hook, the right output does not affect the phone-line.

Figure 9:
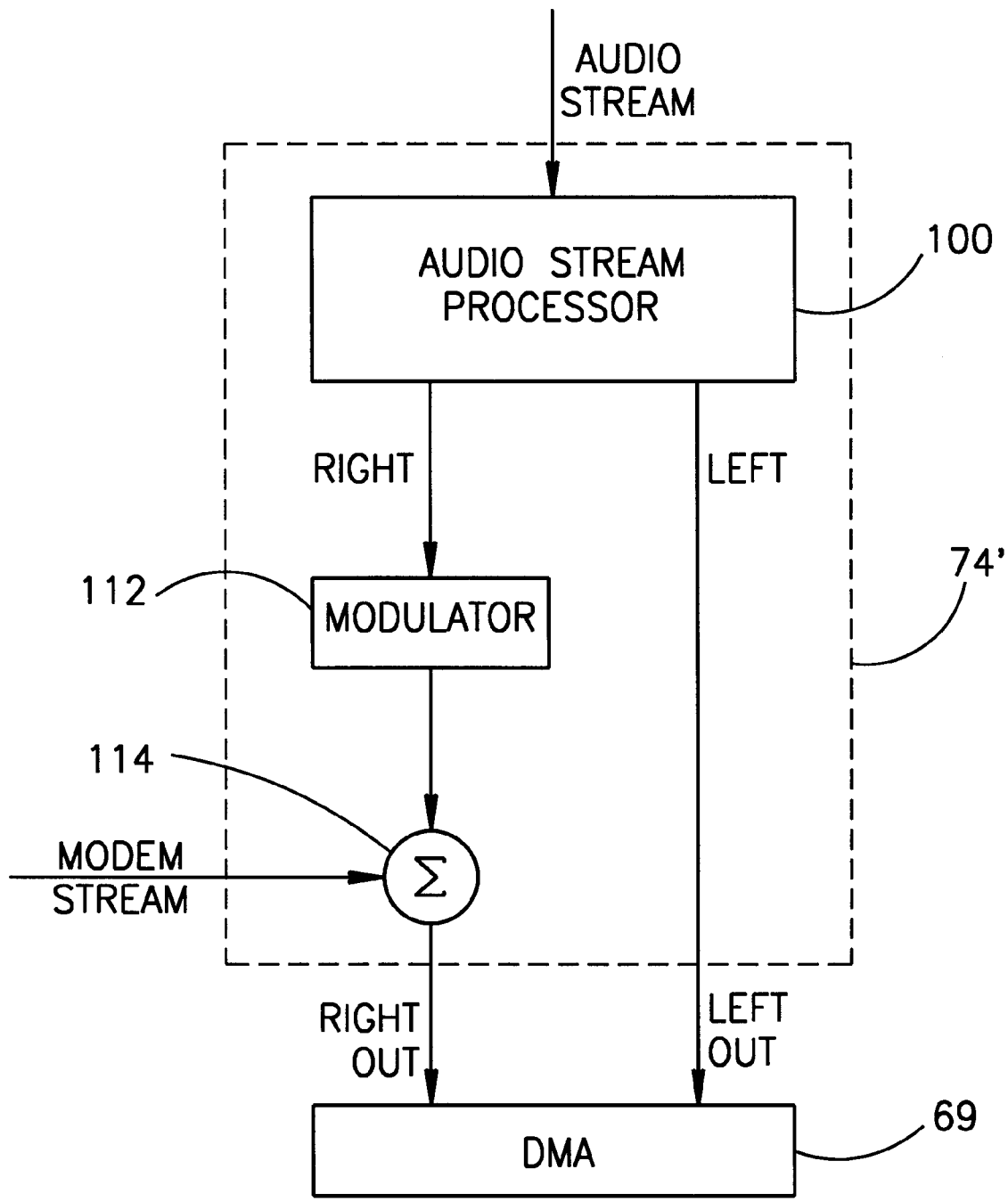
FIG. 9 is a block diagram illustration of a further embodiment of the audio/modem stream controller in which the audio stream is modulated onto the modem stream.
Figure 10:
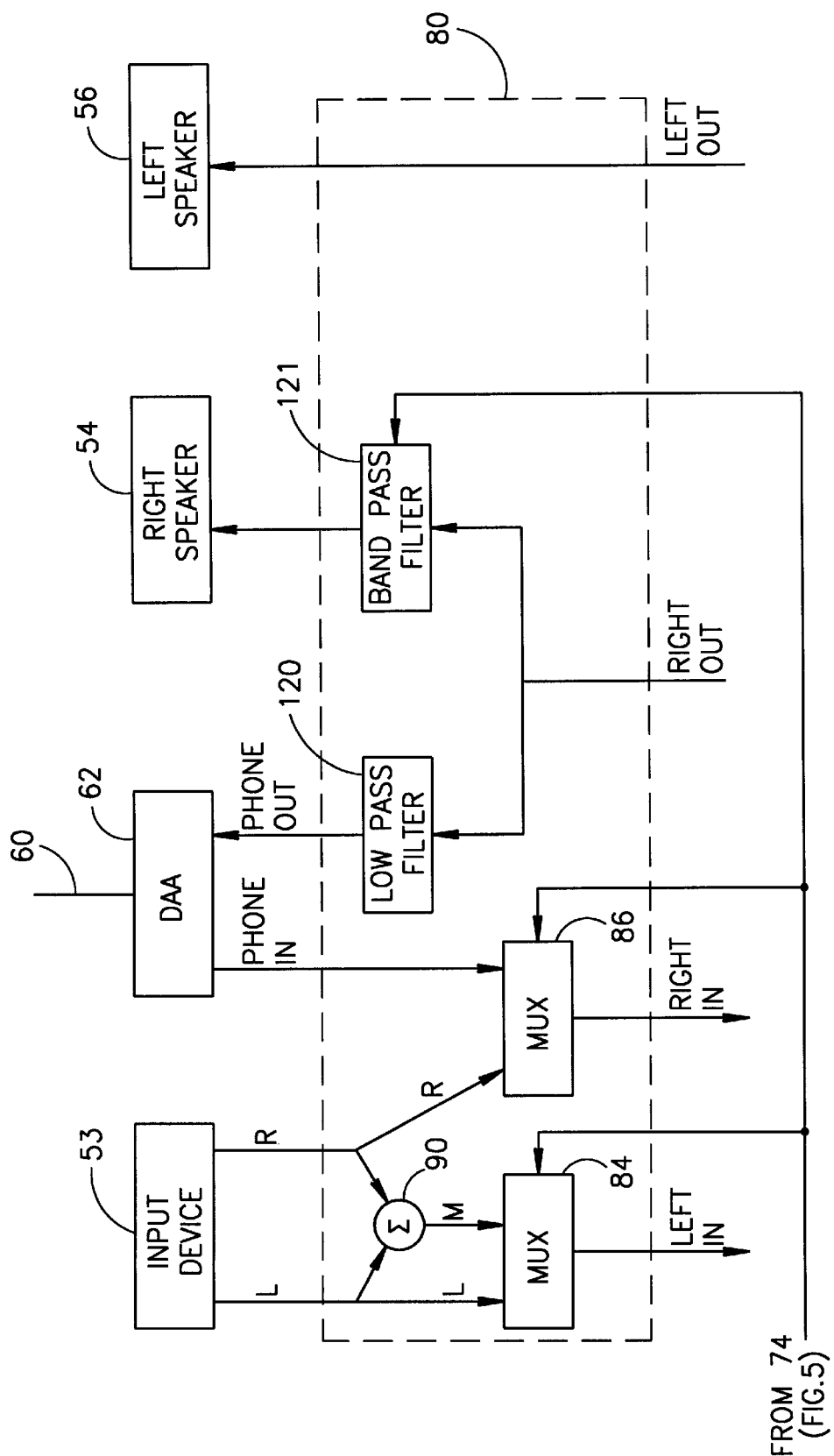
FIG. 10 is a block diagram illustration of the input/output multiplexing unit which operates with the controller of FIG. 9.

Reference is now made to FIGS. 9 and 10 which illustrate a further embodiment of the present invention in which the modem and audio signals are combined into a single signal for the right stream. To do this, the right audio stream is modulated onto a carrier frequency larger than the highest frequency expected in modem data and the two streams are then combined. FIG. 9 illustrates the elements of the modem and audio stream controller 74' for this embodiment and FIG. 10 illustrates the elements of audio/modem MUX 80 for this embodiment.

Controller 74' comprises audio stream processor 100, a modulator 112 and a summer 114. Audio stream processor 100 converts channel data from its original format to a 16 bit, joint modem and audio frequency (e.g., 22 Khz). The right channel then is modulated, by modulator 112, to a frequency above 4 KHz (e.g., 6 KHz). Summer 114 sums the modulator output with the modem data and provides the results to the DMA 69. Audio stream processor 100 provides the converted left audio stream directly to DMA 69.

It will be appreciated that, since modem data typically has no activity above 4 KHz, the modulated audio right signal will not interfere with the modem data and thus, the combined signal can be provided along a single channel, e.g. the right output channel.

For this embodiment and as shown in FIG. 10, MUX 80 comprises two small multiplexers 84, 86, summer 90, a low-pass-filter 120 and a band-pass-filter 121. The multiplexers 84 and 86 and summer 90 are controlled by a switch control signal from the modem and audio stream controller 74', as before. On input, summer 90 combines the left (L) and right (R) output signals of the input device 53 into a monophonic (M) audio signal. MUX 84 provides the left input signal to the audio component 50 and selects between the right (R) signal and the input phone signal (phone-in).

On output, when both modem and audio signals are created, controller 74' provides the left (e.g. unmodulated) audio stream signal along the left output channel, directly to the left speaker 56. On the right channel, controller 74' provides the combined right audio modem streams. The bandpass filter 121 extracts the right audio stream and sends it to right speaker 54. Low pass filter 120 extracts the modem stream and sends it to the DAA phone-out. In this way, stereo audio is played along with modem.

When only audio is active (no modem), the right channel contains only the right audio stream and filter 121 is transparent. It is noted that low pass filter 120 has a cut-off frequency of 4 Khz (the typical upper frequency of modem signals and bandpass filter 121 has a frequency range of 6–28 KHz).

It will be appreciated by persons skilled in the art that the present invention is not limited to what has been particularly shown and described hereinabove. Rather the scope of the present invention is defined by the claims which follow:

We claim:

1. A combined audio and modem interface unit comprising:
   an audio component having two internal input and two internal output channels and selectably connectable to at least an audio left port, an audio right port and a telephone port; and
   an audio/modem signal processing unit for simultaneously processing analog modem and audio signals received from said audio component.

2. A interface unit according to claim 1 wherein said audio/modem signal processing unit is operative within a central processing unit (CPU) of a computer system.

3. An interface unit according to claim 2 and wherein said audio/modem signal processing unit comprises:
   a a native signal processing modem for processing said modem signals; and
   b a logical switch for switching operation between a modem mode, during which said logical switch provides the output of said audio component to said native signal processing modem, and an audio mode, during which said logical switch provides the output of said audio component to audio processing units of said CPU.

4. An interface unit according to claim 1 and also including a telephone interface unit for communicating with said modem channel and a control unit for receiving and responding to telephony control signals, such as at least Ring detection and on/off hook signals.

5. An interface unit according to claim 1 also comprises a modem pre-filter for converting telephony signals from audio level filtering to modem level filtering including converting the sampling rate, increasing the sampling bit accuracy of the signals and sharpening the signal.

6. A combined audio and modem interface unit comprising:
   an audio component having two internal input and two internal output channels and selectably connectable to at least an audio left port, an audio right port and a telephone port;
   an audio/modem signal processing unit for separately processing modem and audio signals received from said audio component; and
   where said audio/modem signal processing unit is operative within a central processing unit (CPU) of a computer system and comprises;
   a native signal processing modem for processing said modem signals;
   an audio stream processor for processing said audio signals in monophonic and streophonic modes, as directed; and
   a data controller for directing the modem signals to said native signal processing modem whenever modem signals are present, for directing the audio signals, whenever present, to said audio stream processor and for indicating to said audio stream processor to operate in the monophonic mode whenever modem signals are present and in either of said monophonic and stereophonic modes otherwise.

7. An interface unit according to claim 6 and wherein said audio stream processor, when in said monophonic mode, includes means for converting between any possible audio format, as desired by an audio application, and a 16 bit monophonic, uncompressed format.

8. An interface unit according to claim 6 and also comprising an input/output mixing unit for selecting the desired ones of said audio left, audio right and telephone ports, as per instructions from said datastream controller, and for connecting the selected channels with the appropriate ones of said internal input and output channels.

9. An interface unit according to claim 6 Wherein said datastream controller comprises, on output, means for modulating a first audio channel and for combining said modulated first audio channel with said modem signals and wherein said interface unit also comprises an output unit for separating said combined audio and modem signals, for providing said modem signals to said telephone port, said first audio channel to a first one of said audio ports and a second audio channel directly to a second one of said audio ports.

10. A combined audio and modem interface unit comprising:

an audio component having two internal input and two internal output channels and selectable connectable to at least an audio left port, an audio right port and a telephone port;

an audio/modem signal precessing unit for separately processing modem and audio signals received from said audio component;

a telephone interface unit for communicating with said modem channel and a control unit for receiving and responding to telephony control signals, such as at least Ring detection and on/off signals;

and wherein said control unit comprises logic input/output ports, connectable to said telephone interface unit for receiving said telephony control signals and to interrupt registers connected to said logic input/output ports, said logic input/output ports and said interrupt registers forming part of the audio component.

11. A combined audio and modem interface unit comprising:

an audio component having two internal input and two internal output channels and selectable connectable to at least an audio left port, an audio right port and a telephone port;

an audio/modem signal processing unit for separately processing modem and audio signals received from said audio component;

a telephone interface unit for communicating with said modem channel and a control unit for receiving and responding to telephony control signals, such as at least Ring detection and on/off signals;

and wherein said control unit comprises control input pins forming part of said audio interface unit and connectable to said telephone interface unit for receiving said telephony control signals and to registers for changing state in accordance with the state of said telephony control signals, and a timer interrupt unit for periodically reviewing the status of said registers and generating an interrupt in response to the state of said registers.

12. A combined audio and modem interface unit comprising:

an audio component having two internal input and two internal output channels and selectably connectable to at least an audio left port, an audio right sort and a telephone port;

an audio/modem signal processing unit for separately processing modem and audio signals received from said audio component;

a telephone interface unit for communicating with said modem channel and a control unit for receiving and responding to telephony control signals, such as at least Ring detection and on/off signals;

and wherein said control unit comprises flip flop units, connectable to said telephone interface unit for receiving said telephony control signals and associated with registers of said audio component, for changing state in accordance with the state of said telephony control signals, and a timer interrupt unit for periodically accessing said registers and said flip flop units and generating an interrupt in response to the state of said registers.

13. A combined audio and modem interface unit comprising:

an audio component having two internal input and two internal output channels and selectable connectable to at least an audio left port, an audio right port and a telephone port;

an audio/modem signal processing unit for separately processing modem and audio signals received from said audio component;

a telephone interface unit for communicating with said modem channel and a control unit for receiving and responding to telephony control signals, such as at least Ring detection and on/off signals;

and wherein said control unit comprises flip flop units, connectable to said telephone interface unit for receiving said telephony control signals and to interrupt lines of said audio component, for changing state in accordance with the state of said telephony control signals and for generating an interrupt when said telephony control signals are activated.

14. A method for generally simultaneously communicating audio and modem signals with a personal computer, the method comprising the steps of:

a providing an audio component having first and second input/output channels;

b providing a monophonic audio signal along said first input/output channel and a modem signal along said second input/output channel, said audio component producing, on output, a datastream alternating between data of said first and second channels; and c streaming said datastream to the appropriate one of audio and modem processing units.

15. A method according to claim 14 and wherein said step of streaming includes the steps of:

a transferring said datastream to a memory element of said personal computer wherein data from said first channel is written to a first set of addresses within said memory element and data from said second channel is written to a second set of addresses within said memory element; and b indicating to said audio processing unit to read from said first set of addresses and to said modem processing unit to read from said second set of addresses.

16. A method for generally simultaneously communicating audio and modem signals with a personal computer, said audio signals comprising first and second audio component signals, the method comprising the steps of:

a providing an audio card having first and second input/output channels;

b on output, combining said modem signals and said first audio component signal by modulating said first audio component signal above the highest expected frequency of said modem signals and providing said combined signal along a first output channel to said audio card;

c providing said second audio component along a second output channel to said audio card; and d on said audio card:

i separating said combined signal into said modem signal and said first audio component signal;

ii providing said modem signal to a telephone port;

iii providing said first audio component signal to a first speaker; and iv providing said second audio component signal to a second speaker.

17. A combined audio and modem interface unit comprising:

an audio component having left input, right input, left output, right output and mono output channels, wherein said left input and right input channels are selectably connectable to an audio left input port, an audio right input port and a telephone input port, and wherein said right, left and mono output channels are directly connected to one of a telephone output port, a right speaker and a left speaker; and an audio/modem signal processing unit for simultaneously processing modem and audio signals received from said audio component.

\* \* \* \* \*